(12) United States Patent
Furlong et al.

(10) Patent No.: US 7,246,316 B2
(45) Date of Patent: Jul. 17, 2007

(54) METHODS AND APPARATUS FOR AUTOMATICALLY GENERATING PRESENTATIONS

(75) Inventors: Tarri E. Furlong, San Leandro, CA (US); Wan C. Lee, Sunnyvale, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1028 days.

(21) Appl. No.: 09/725,750

(22) Filed: Nov. 30, 2000

(65) Prior Publication Data

US 2007/0055939 A1 Mar. 8, 2007

Related U.S. Application Data

(60) Provisional application No. 60/168,208, filed on Nov. 30, 1999.

(51) Int. Cl.
G06F 17/00 (2006.01)
G06F 3/00 (2006.01)

(52) U.S. Cl. ............ 715/730; 715/500; 715/505; 715/507; 715/731

(58) Field of Classification Search ............ 715/500, 715/500.1, 515, 513, 506, 507, 508, 505; 345/730, 731, 732; 707/1, 3
See application file for complete search history.

(56) References Cited

U.S. PATENT DOCUMENTS

| | | | | |
|---|---|---|---|---|
| 5,500,936 A * | 3/1996 | Allen et al. | | 345/808 |
| 5,983,227 A * | 11/1999 | Nazem et al. | | 707/10 |
| 6,008,807 A * | 12/1999 | Bretschneider et al. | | 345/732 |
| 6,072,480 A * | 6/2000 | Gorbet et al. | | 715/730 |
| 6,128,629 A * | 10/2000 | Bretschneider et al. | | 707/203 |
| 6,192,380 B1 * | 2/2001 | Light et al. | | 715/505 |
| 6,195,665 B1 * | 2/2001 | Jarett | | 715/500 |
| 6,385,592 B1 * | 5/2002 | Angles et al. | | 705/14 |
| 6,421,733 B1 * | 7/2002 | Tso et al. | | 709/246 |
| 6,490,601 B1 * | 12/2002 | Markus et al. | | 715/507 |
| 6,567,829 B1 * | 5/2003 | Ter Horst et al. | | 715/501.1 |
| 6,590,586 B1 * | 7/2003 | Swenton-Wall et al. | | 715/730 |
| 6,683,649 B1 * | 1/2004 | Anderson | | 348/333.05 |
| 6,694,482 B1 * | 2/2004 | Arellano et al. | | 715/500.1 |
| 6,938,032 B1 * | 8/2005 | Heath et al. | | 707/2 |

(Continued)

OTHER PUBLICATIONS

Moseley et al, "Mastering Microsoft Office 97: Professional Edition," Second Edition, 1997, pp. 711-723.*

(Continued)

*Primary Examiner*—Stephen Hong
*Assistant Examiner*—Adam L Basehoar
(74) *Attorney, Agent, or Firm*—Campbell Stephenson Ascolese LLP

(57) ABSTRACT

Systems and methods for generating slide presentations enable a user (e.g., a sales professional) to generate presentations tailored to a specific presentation target (e.g., a potential customer) with the click of a button. An exemplary method includes: collecting information relating to a number of presentation targets; creating a number of presentation definition templates, each presentation definition template including a number of slide descriptions, certain of the slide descriptions including information placeholders; and generating a slide presentation for the particular presentation target in accordance with the slide descriptions of a selected one of the presentation definition templates, wherein collected information relating to the particular presentation target is substituted for the information place holders in the slide descriptions of the selected one of the presentation definition templates.

11 Claims, 7 Drawing Sheets

U.S. PATENT DOCUMENTS

| | | |
|---|---|---|
| 7,058,647 B1 * | 6/2006 | Hill .......................... 707/102 |
| 2002/0029208 A1 * | 3/2002 | Josephson .................. 707/1 |
| 2003/0144998 A1 * | 7/2003 | Bennett et al. ............... 707/3 |
| 2004/0210845 A1 * | 10/2004 | Paul et al. .................. 715/731 |
| 2005/0039131 A1 * | 2/2005 | Paul ........................... 715/730 |
| 2005/0216431 A1 * | 9/2005 | Baker et al. ................. 707/1 |
| 2006/0085449 A1 * | 4/2006 | Sattler et al. ............... 707/100 |

OTHER PUBLICATIONS

Microsoft PowerPoint 2000, Mar. 10, 1999, "Selling an Idea for a Product," pp. 1-9.*

* cited by examiner

METHODS AND APPARATUS FOR AUTOMATICALLY GENERATING PRESENTATIONS

CROSS-REFERENCE TO RELATED APPLICATIONS

This patent application claims priority to U.S. Provisional Patent Application No. 60/168,208, filed Nov. 30, 1999 and entitled "Document and Presentation Generator Method and System," the entirety of which is incorporated herein by reference.

BACKGROUND OF THE INVENTION

1. Field of the Invention

The present invention relates generally to organization management technology, and more particularly, to network-based systems and methods for sales force management.

2. Discussion of the Related Art

Sales management technology has grown up in the era of large multinational organizations. Often, such large organizations require large sales forces, the management and performance of which is often a critical component of a corporation's success. As a result, organizations have sought to improve the process by which sales professionals practice their craft through the use of sales management applications. Sales management applications enable organizations to define, manage, and track the implementation of the sales process. Consequently, an organization is able to constructively guide the daily activities of a sales professional to the betterment of the organization.

The daily activities of a sales professional often involve meeting with potential customers, analyzing the customers' needs, and assembling presentations for the customers that describe solutions to the customers' problems. Traditionally, salespeople create presentations by starting with a presentation that worked well in the past and then modifying that presentation for a current prospect. Though doing so is usually more efficient than starting from scratch, this process is also time-consuming and error-prone. Salespeople must not only change such basic information as the customer's name, but also possibly restructure the presentation so that it fits the new prospect's unique needs. For example, the original presentation may have included slides directed to the value of the organization's product, whereas the new prospect is more concerned with other decision criteria, such as speed or extra features. Due to these differences, the new presentation can take a long time to create and may not match the needs of the customer.

Accordingly, there is a need for improved systems and methods for creating sales and other types of presentations.

SUMMARY OF THE INVENTION

The present invention addresses the drawbacks associated with conventional presentation generation by providing systems and methods that enable a user (e.g., a sales professional) to generate presentations automatically. According to exemplary embodiments, an administrator of an organization creates dynamic presentation templates which enable users to build opportunity-targeted presentations at the click of a button. Advantageously, information that users have collected in connection with an opportunity, such as products, competitors, decision criteria, etc., is used to automatically create a compelling presentation tailored specifically for the customer. With such a presentation in hand (i.e., a presentation containing the correct data/approach for a current prospect), a user need not spend time modifying an old presentation to fit a current opportunity. Instead, the user can focus on adding deal-specific value to the presentation, or on carrying out other important business activities.

An exemplary method for generating a slide presentation includes the steps of: collecting information relating to a number of presentation targets; creating a number of presentation definition templates, each presentation definition template including a number of slide descriptions, certain of the slide descriptions including information placeholders; and generating a slide presentation for the particular presentation target in accordance with the slide descriptions of a selected one of the presentation definition templates, wherein collected information relating to the particular presentation target is substituted for the information place holders in the slide descriptions of the selected one of the presentation definition templates. According to an exemplary embodiment, the presentation targets are potential customers of a sales organization, and certain of the collected information relates to potential sales opportunities between the sales organization and the potential customers. According to another exemplary embodiment, the presentation definition template used to generate the slide presentation for the particular presentation target is selected in accordance with a parameter associated with the particular presentation target. Fore example, where the particular presentation target is a potential customer of a sales organization, the parameter associated with the particular presentation target can be a primary decision criterion of the potential customer.

These and other features and advantages of the invention are described hereinafter with reference to a number of exemplary embodiments depicted in the accompanying drawings. Those of skill in the art will appreciate that the exemplary embodiments are provided by way of illustration only, and that numerous equivalent embodiments are also contemplated herein.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The present invention is discussed below with respect to various explanatory embodiments. While specific implementations are discussed, it should be understood that this is done for illustrative purposes only. Various features of the present invention can be extended to other applications and embodiments, as will be apparent to those of ordinary skill in the art.

Figure 1:
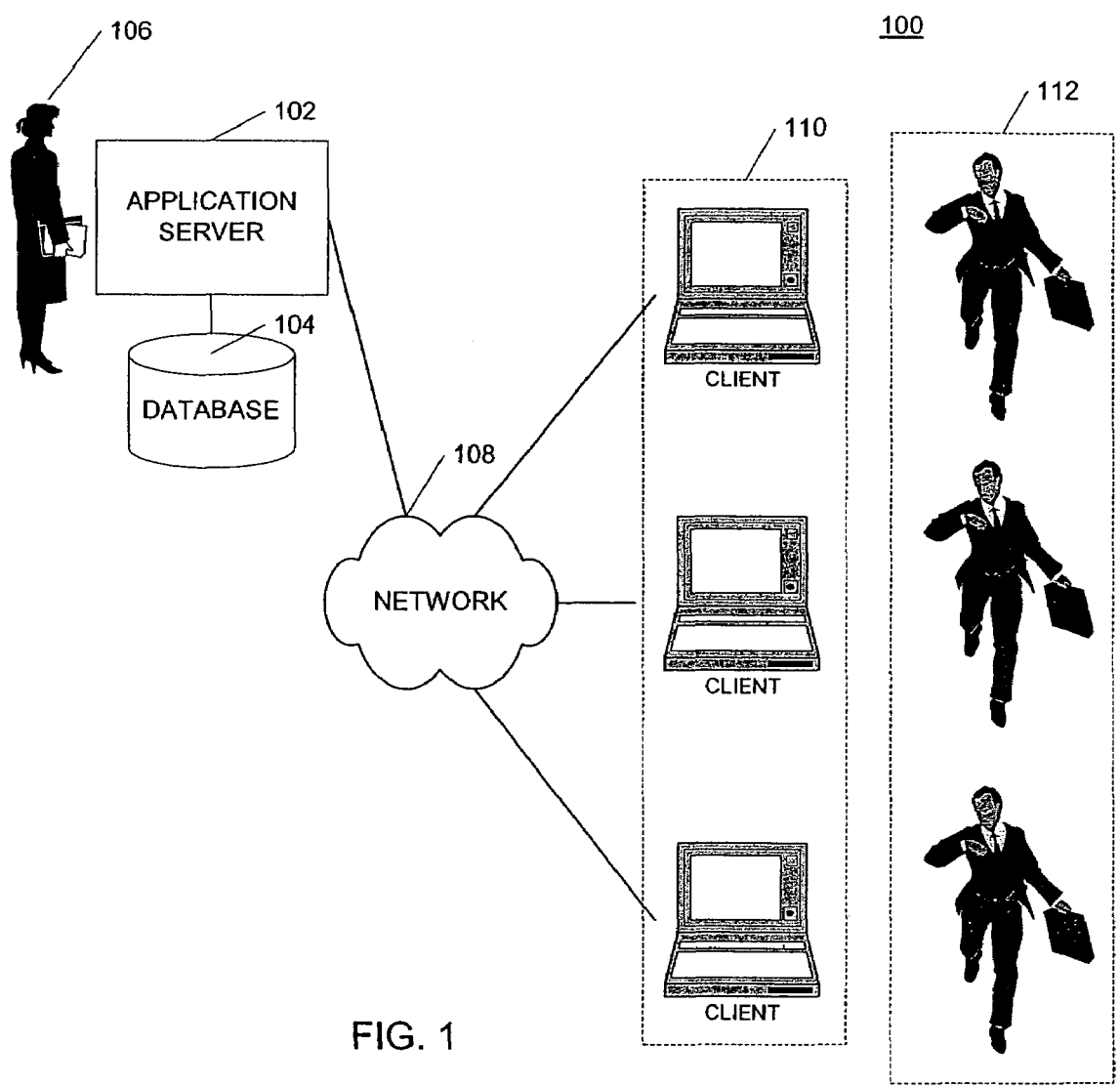
FIG. 1 depicts an exemplary system according to an embodiment of the invention.

FIG. 1 depicts an exemplary system 100 according to embodiments of the invention. As shown, system 100 includes application server 102, database 104, network 108, and clients 110. In operation, application server 102 and clients 110 execute a sales management application providing features and functionality described below.

Those of ordinary skill will appreciate that application server 102 can be any device capable of providing an execution platform for the sales management application. Examples of application server 102 are personal computers ("PCs"), mainframes, mini-computers, etc. Database 104 stores the information for the operation of application server 102, and can be any data storage system, such as Oracle™, SQL Server™, files, directories, etc.

An application administrator 106 interacts with the sales management application on application server 102, providing for data entry, administration, and other tasks as described in further detail below. It should be noted that although application administrator 106 is shown as interacting with application server 102 directly, application administrator 106 can interact with application server 102 via a client, such as one of clients 110.

As shown in FIG. 1, application server 102 communicates with clients 10 via network 108. In practice, network 108 can be any data communication network, such as the Internet, a wireless network, a local area network, a wide area network, an intranet, etc.

Application server 102 provides sales management application functionality to clients 110 for users 112 as described in further detail below. Client 110 can be any computing platform capable of interacting with application server 102. Clients 110 can include, for example, PCs, notebook computers, wireless personal digital assistants ("PDAs"), network enabled phones, etc. Also, users 112 can include anyone that interacts with a client 110, such as a sales professional, an administrator, a secretary, etc. A user 112 accesses the sales management application executing on application server 102 via network 108 using a client 110.

According to exemplary embodiments, system 100 provides, among other things, opportunity-tracking features and functionality to users 112. In other words, system 100 enables users 112 to gather, maintain and share information regarding target opportunities (e.g., prospective customers), such information including, for example, customer name, address, revenue, personnel hierarchy, products of interest, primary decision criteria (e.g., product price, speed, features, etc.), competitors, purchasing history and so on. Such information is maintained in the database 104, and users 112 access the information via the clients 110 (e.g., via a graphical user interface which permits a user to view and manipulate data for existing opportunities).

Figure 2:
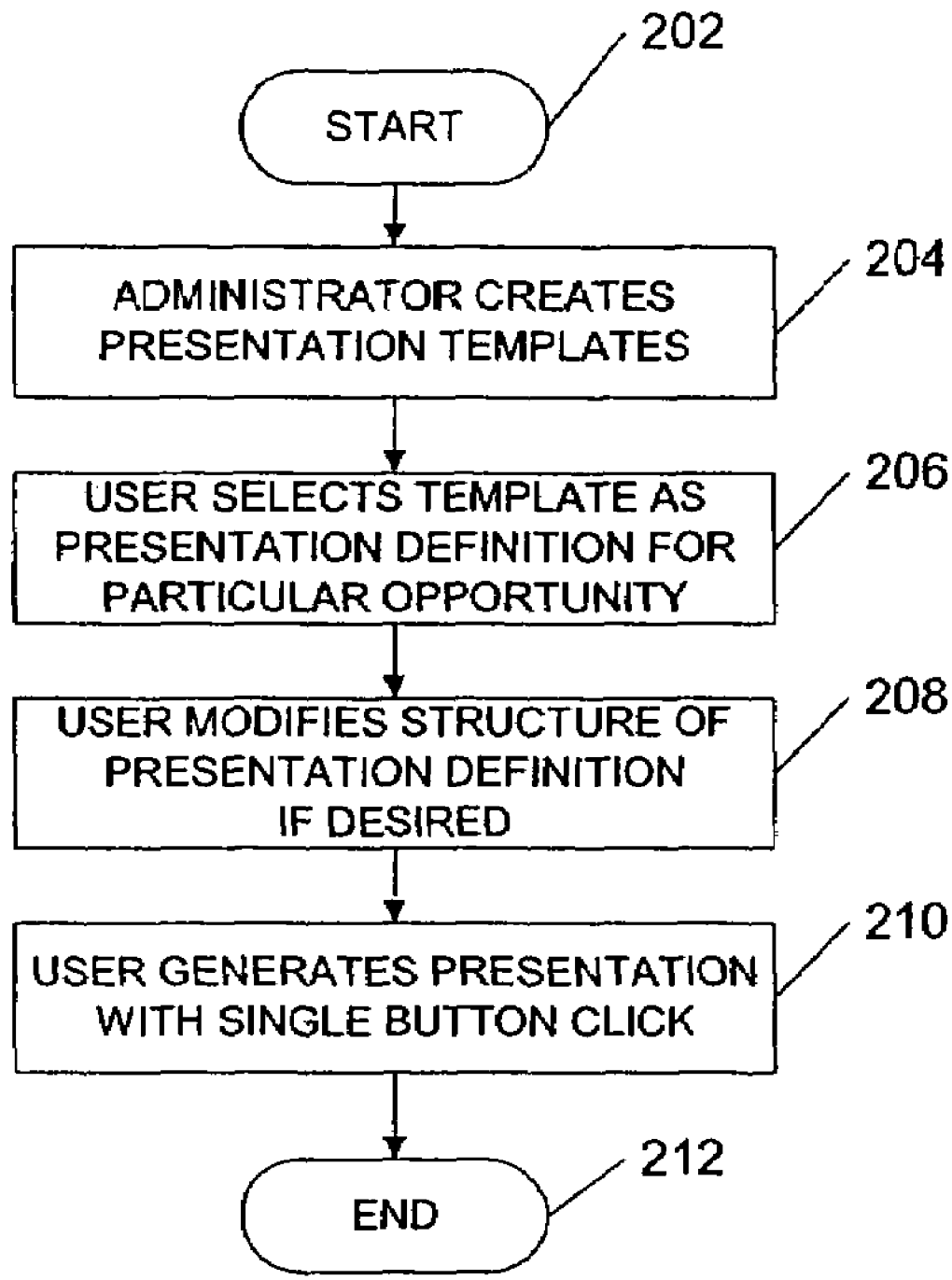
FIG. 2 depicts an exemplary method of presentation generation according to an embodiment of the invention.

As described in the Background of the Invention, a user will often wish to generate a presentation tailored for a particular opportunity. FIG. 2 depicts an exemplary method 200 for enabling a user to do so with a minimum of effort. As shown, the exemplary method 200 begins at step 202, and the administrator 106 creates a number of presentation templates at step 204.

As is described in more detail below, a presentation template is a structured collection of component (e.g., slide) definitions from which a presentation is generated. Advantageously, each template can have a unique structure and theme so that it is well-suited for a particular type of opportunity (e.g., an opportunity having a particular primary decision criterion). Moreover, the component definitions in a template can include bookmarks, or placeholders, where opportunity-specific data is inserted when a presentation is generated from the template. Thus, as is made apparent below, such administrator-defined templates enable quick and automatic generation of sophisticated and correctly-focused presentations.

At step 206 of FIG. 2, a user 112 selects one of the presentation templates as a starting point for a presentation targeted to a particular opportunity of interest. In other words, as is described in detail below, a copy of the selected template is used as a presentation definition for the particular opportunity. At step 208, the user 112 can modify the structure and content of the presentation definition if desired and, at step 210, the user 112 can then generate an opportunity-specific presentation from the prevailing presentation definition (e.g., by clicking a button on a graphical user interface at a client 110).

Figure 3:
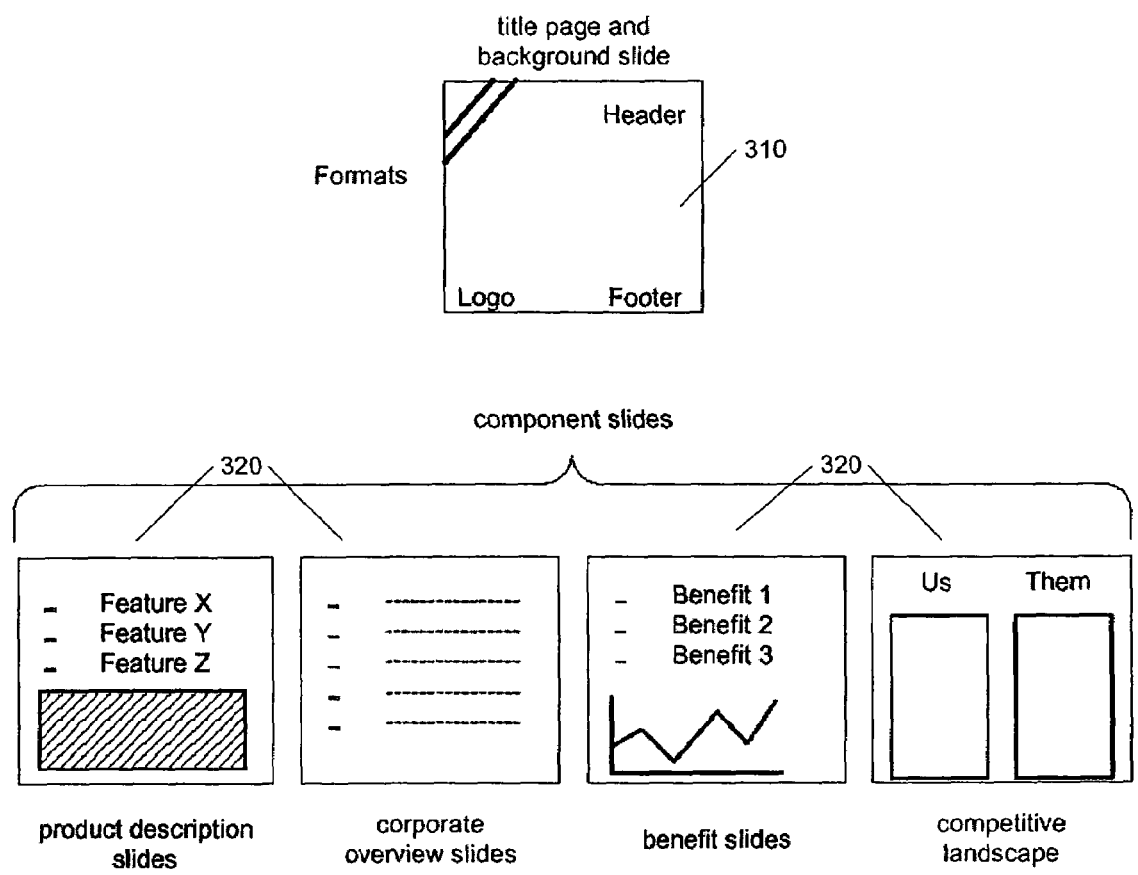
FIG. 3 depicts exemplary slides which can be included in a presentation generated according to embodiments of the invention.

Each of the steps of method 200 is described in greater detail below. To facilitate discussion, it is presumed that presentations are generated in the well known Microsoft™ PowerPoint™ format. Thus, as shown in FIG. 3, a presentation includes one background slide 310 and any number of component slides 320. Although the following discussion is directed to Microsoft™ PowerPoint™ presentations, those of skill in the art will immediately recognize that the disclosed principles are also readily utilized with other presentation-generation software.

Figure 4:
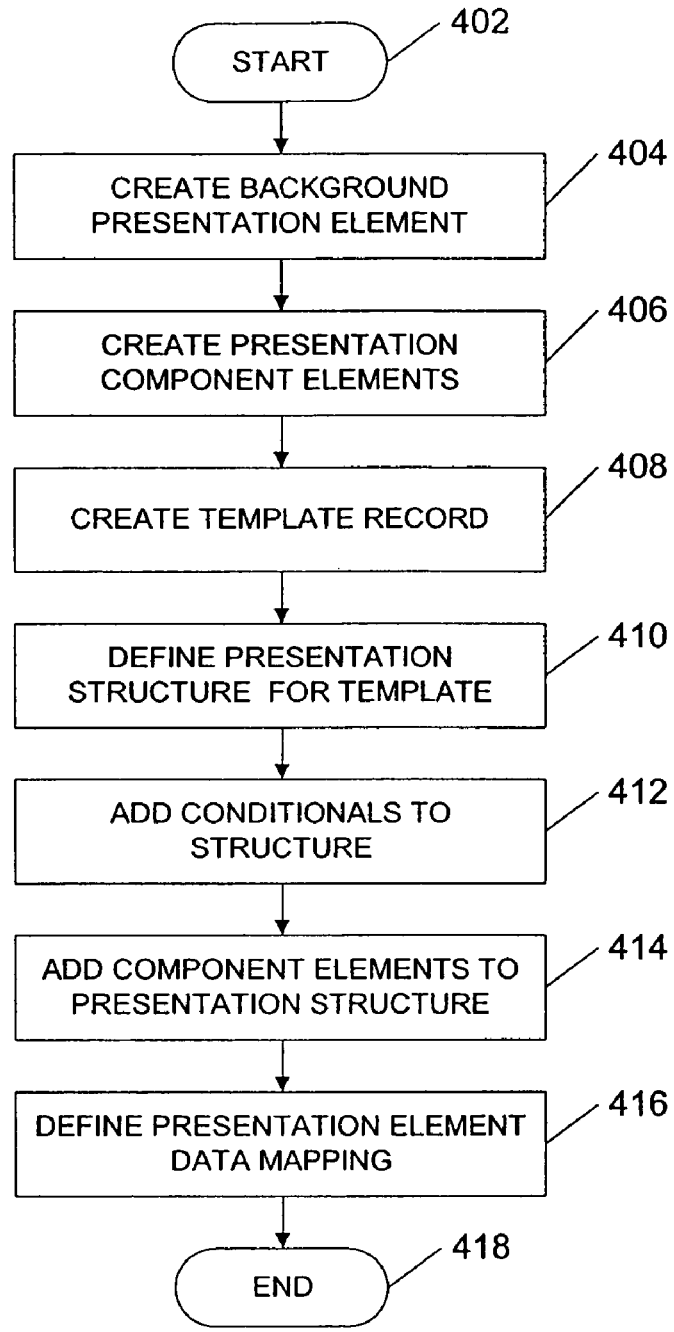
FIG. 4 depicts an exemplary method of creating presentation templates according to an embodiment of the invention.

FIG. 4 depicts an exemplary method 400 of generating a presentation template (e.g., in step 204 of FIG. 2). As shown, the process begins at step 402 and, at step 404, the system administrator 106 creates (e.g., using PowerPoint™) a background slide for the template. The background slide in a template defines the title slide for each presentation generated from the template, and also specifies the overall layout and formatting for each presentation so generated. The background slide can include, for example, company logos, special colors and background designs, headers and footers, etc.

Once the background slide is created, the administrator 106 can, at step 406 of FIG. 4, create any number of component slides to be included in the template. Specifically, the administrator creates (e.g., again using PowerPoint™) component slides including a combination of fixed information (e.g., standard text, pictures, bullet points, etc.) and/or replaceable information bookmarks. As is described in more detail below, the bookmarks are replaced by opportunity-specific data when a presentation is generated from the template. In exemplary embodiments, bookmarks are distinguished from standard text within a component slide by surrounding each bookmark with double square brackets (i.e., [[ ]]).

Once the background and component slides have been created, the administrator 106 creates, at step 408, a database record for the template (i.e., a record in database 104). The template record includes, for example, a template name (for later referencing the template), a mapping name (indicating, as described below, a database record which defines how bookmarks in the template are to be mapped to opportunity-specific database records), and an optional theme (indicating, as described below, that the template is to be used for opportunities having a particular characteristic—e.g., for opportunities having a particular primary decision criterion).

At step 410 of FIG. 4, the administrator 106 defines a structure for the template. Specifically, each template includes one or more sections, each section potentially including subsections. According to exemplary embodiments, there are a number of different section types, including file sections, chart sections, table sections and bullet sections. File sections include component slides created at step 406, whereas chart, table and bullet sections include pointers to database objects which are used to automatically generate chart slides, table slides and bullet slides, respectively, when a presentation is created from the template. The template structure information (as well as the pointers in any chart, table or bullet sections included in the template structure) is stored in the template record on database 104.

At step 412 of FIG. 4, the administrator 106 can selectively associate a query condition with each of the sections, subsections and components of the template so that any particular section, subsection or component will be included in a presentation only when the associated query condition is satisfied. For example, a particular component slide might be included only when the revenue associated with a particular opportunity exceeds a predefined threshold. The query conditions are also stored in the template record on database 104.

Once the template structure and conditionals have been established, the administrator 106, at step 414, associates the template components created at step 406 with the template structure defined at step 410. In other words, the administrator specifies which of the component slides is included in each of the file sections of the template. Again, this information is stored in the template record on database 104.

At step 416, the administrator 106 establishes the above-noted mapping between the bookmarks used in the component slides and the database fields associated with the opportunities stored on database 104. To do so, the administrator 106 creates a field map database record (e.g., a record on database 104), such record indicating, for each bookmark name used in the component slides, the particular opportunity field which is to be substituted for the bookmark name when a presentation is generated. For example, each instance of bookmark [["Company"]] can be replaced with the actual company name associated with an opportunity.

Once the field mapping is established, the exemplary template creation method 400 ends at step 418. The administrator 106 can then repeat the method 400 as desired to create any number of presentation templates (e.g., each template being particularly suited for a different primary decision criterion). Thereafter, the users 112 can select from the existing templates in creating opportunity-specific presentations (e.g., in step 206 of FIG. 2).

Figure 5:
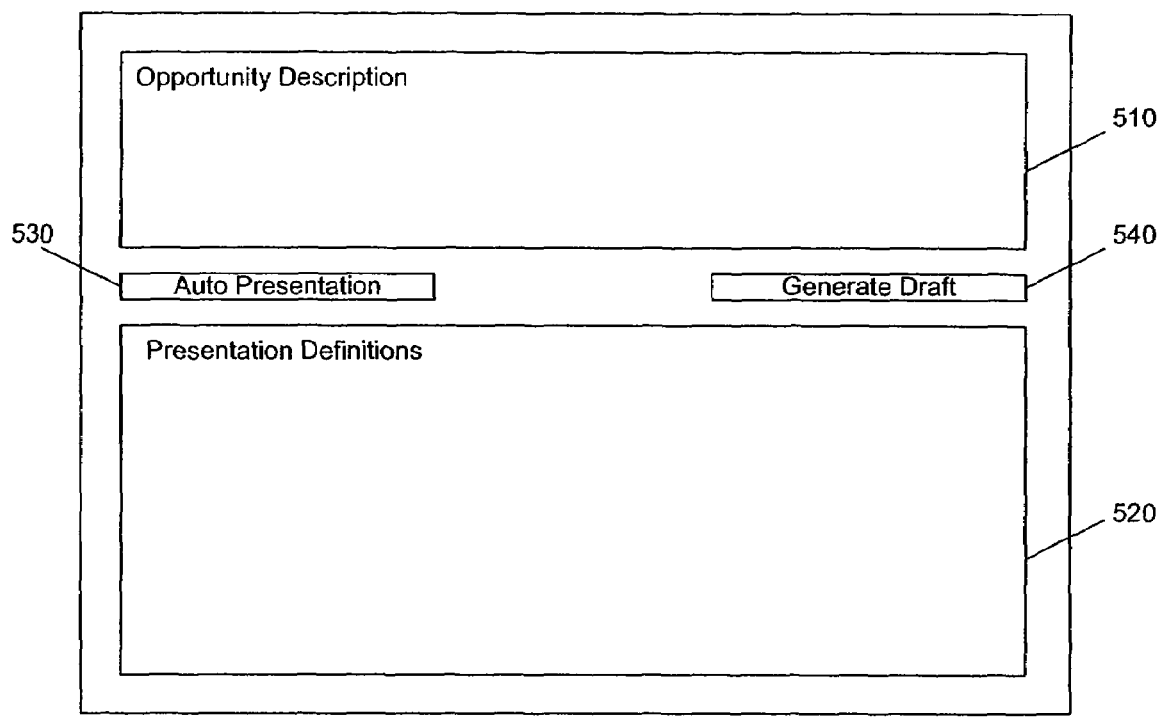
FIGS. 5 and 6 depict exemplary graphical user interfaces according to an embodiment of the invention.

FIG. 5 depicts an exemplary user interface 500 which enables a user to select a template for use in generating an opportunity-specific presentation. The interface is, for example, presented to a user 112 via a client 110 upon the user indicating at client 110 that he or she wishes to generate a presentation for a particular opportunity (e.g., by highlighting an opportunity displayed on-screen at client 110, and clicking a "presentations" button also displayed on-screen at client 110). As shown, the exemplary interface 500 includes an opportunity description area 510, a presentation definitions list area 520, an auto-presentation button 530, and a generate-draft button 540.

The opportunity descriptions area 510 is used to display (and perhaps provide for modification of) the above-described fields associated with a particular opportunity (e.g., customer or account name, address, revenue, decision criteria, etc.). Additionally, the presentation definitions list area 520 is used to list (e.g., by file name, date of creation, etc.) any presentation definitions which have been created for the opportunity displayed in area 510.

To create a presentation definition for the displayed opportunity, the user first selects one of the above described administrator-defined templates. For example, the user can simply depress (e.g., via a mouse-driven cursor) the auto-presentation button 530. If so, then the template corresponding to a particular opportunity data field (e.g., a primary decision criterion data field) is chosen. If no such template exists, or if the data field has not been defined for the displayed opportunity, then a default template can be selected. Alternatively, the user 112 can manually select any one of the administrator-defined templates (e.g., by way of a drop-down menu which is not shown in FIG. 5). In any case, the selected template is used to create a new presentation definition for the opportunity displayed in area 510. In other words, a new presentation record is created in database 104, the new presentation record being a differently-named replica of the database record associated with the selected template. The newly established presentation definition is then displayed in list area 520. At such time, the user 112 can modify the structure of the presentation definition if desired (e.g., in step 208 of FIG. 2).

Figure 6:
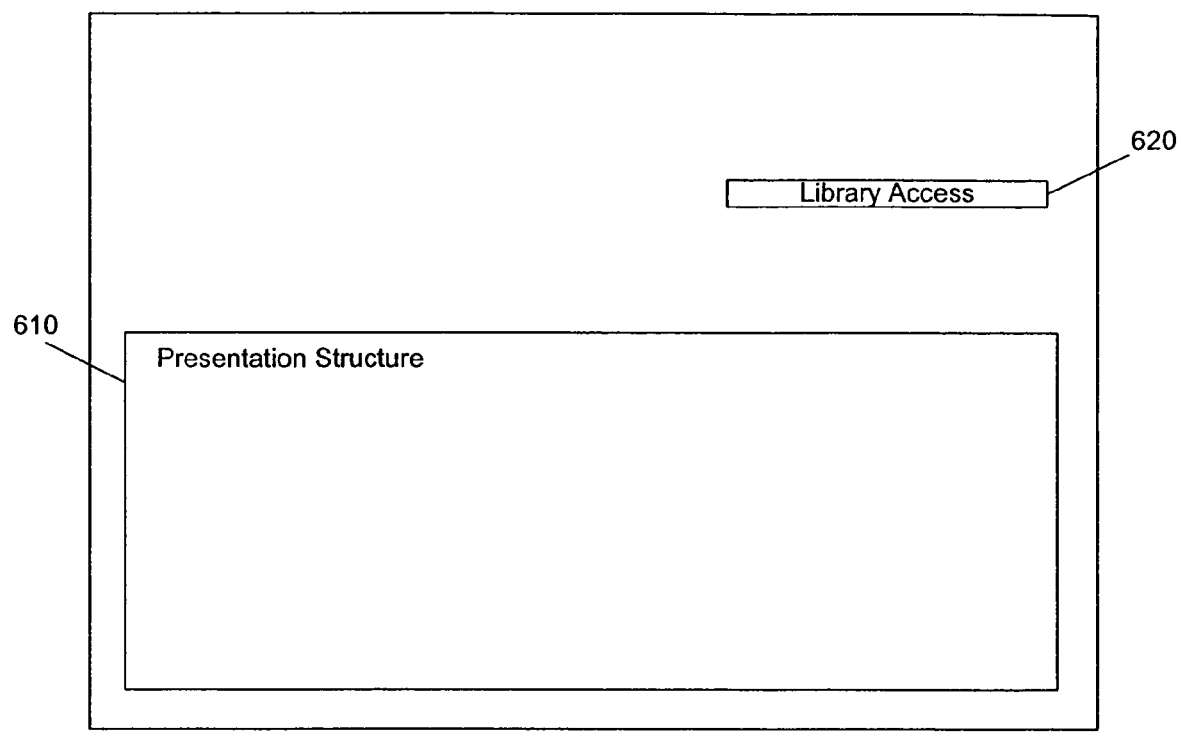

FIG. 6 depicts an exemplary user interface 600 which enables a user to modify a presentation definition. The interface 600 is, for example, presented to the user 112 via client 110 upon the user indicating, via interface 500, that he or she wishes to modify a particular presentation definition (e.g., by double-clicking on a presentation definition listed in area 520 of interface 500). As shown, the exemplary interface 600 includes a presentation structure list area 610 and a library acess button 620.

The structure list area 610 is used to display the sections, subsections and components of the presentation definition. Moreover, area 610 permits the user 112 to manipulate the displayed structure. For example, the user 112 can reorder sections, shift components from one section to another, etc. Additionally, the user 112 can, by clicking on button 620, access a library of useful components which can be added to the presentation definition. Such library components are, for example, predefined and made available by the administrator 106. Once the user is satisfied with the presentation definition structure, he or she can return to interface 500 to generate an actual presentation from the presentation definition (e.g., in step 210 of FIG. 2).

Figure 7:
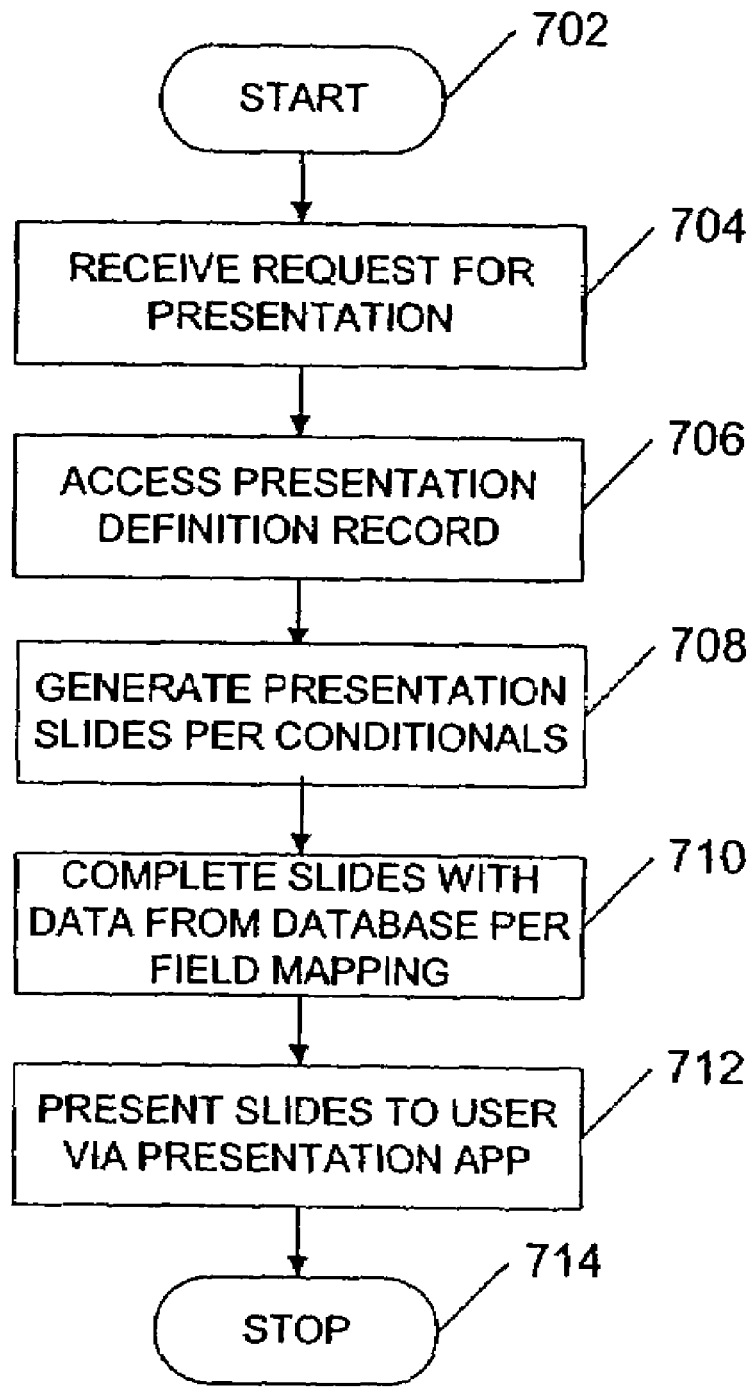
FIG. 7 depicts an exemplary single-click method of generating a presentation according to an embodiment of the invention.

To do so, the user 112 merely clicks on the generate-draft button 540. At such time, an opportunity-specific presentation is automatically generated, for example in accordance with the method 700 of FIG. 7. As shown in FIG. 7, application server 102 receives the request for presentation generation (i.e., an indication that button 540 has been depressed) at step 704. Upon receiving the request, the application server 102 accesses the presentation definition database record at step 706, and generates the presentation slides, per any defined conditionals, at step 708. At step 710, the presentation slides are completed by replacing any bookmarks with appropriate opportunity-specific data, as defined in the field mapping identified in the presentation definition record. Finally, at step 712, the finished presentation slides are presented to the user (e.g., by launching PowerPoint™ at the client 110) for viewing and manipulation.

At such time the user is able to work with and save the presentation just as he or she would any other classically generated presentation. However, because the automatically generated presentation is inherently on-point (e.g., directed to an appropriate decision criterion) and already includes significant opportunity-specific data, the user is free to focus on deal-specific modifications and need not waste time on preliminary presentation setup.

Those of skill will appreciate that the above described functionality of the exemplary embodiments can be implemented across a wide array of platforms using a wide array of computer program logic. Any combination of computer logic, such as hardware, firmware, and software can be used to implement the functionality. Examples of the types of computer logic that can be used include C++, VisualBasic™, Java™, and C programming languages, Hypertext Markup Language ("HTML"), client and server side scripting, etc. Additionally, the above described functionality can be deployed over the World Wide Web ("WWW") to a browser as a network based application using various HTML, JavaScript, server-side and client-side programming, and other network program logic, as would be apparent.

Although the present invention has been discussed above in reference to examples of embodiments and processes, other embodiments and/or processes are possible. For example, although FIG. 1 illustrates a single system 100 and various coupled entities (such as, for example, application server 102, database 104, network 108, clients 110, etc.), other configurations are possible. For instance, rather than a single network, multiple networks interconnected by the appropriate network gateways, routers and/or bridges are possible. Similarly, the various entities coupled to the network can be coupled through other arrangements, such as through additional associated networks, gateways, etc.

Additionally, although system 100 is depicted in FIG. 1 as including a client/server architecture, the present invention also contemplates a system implemented on a standalone computer, such as a PC, or PDA. Moreover, although the discussion above references a client-server configuration, other embodiments of the present invention can have a client-client configuration. In such a client-client configuration, the methods described above can be performed, at least in part, at a particular client-side entity rather than at a centralized server.

Those of skill in the art will appreciate that the above described embodiments are provided by way of illustration only, and that numerous equivalent embodiments are contemplated herein. For example, although the embodiments have been described with reference to sales presentations and opportunities, they are equally applicable to other types of presentations and presentation targets. Thus, the scope of the invention is not limited by the foregoing description, but is defined by the appended claims, including all equivalents thereof.

What is claimed is:

1. A computer-implemented method for generating a slide presentation for a presentation target, comprising:
   creating at least one presentation definition template comprising a plurality of component definitions, wherein one or more of the component definitions has an associated information bookmark;
   associating a query condition with each component definition, each query condition determining whether the associated component definition is to be included in a slide presentation;
   providing a mapping between each information bookmark and associated opportunity-specific data; and
   in response to a command to generate a slide presentation for the presentation target, the computer performing the acts of:
   determining whether to include each of the plurality of component definitions in the slide presentation based on its associated query condition;
   for each of the component definitions determined to be included in the slide presentation, automatically replacing the associated information bookmark with its mapped opportunity-specific data to generate the slide presentation, wherein said determining uses the opportunity-specific data, and said determining and said replacing are performed without human interaction; and
   storing the generated slide presentation.

2. The method of claim 1, wherein the presentation target is a potential customer of a sales organization, and wherein the opportunity-specific data relates to potential sales opportunities between the sales organization and the potential customer.

3. The method of claim 1 further comprising associating a theme with the template, the theme indicating a primary decision criterion of the presentation target.

4. The method of claim 1, wherein the query condition is a predefined threshold.

5. An apparatus comprising:
   one or more computer memories collectively containing a data structure for a slide presentation, the data structure comprising
      a presentation definition template comprising a plurality of component definitions, wherein
         one or more of the component definitions has an associated information bookmark,
      an association of a query condition with each component definition, each query condition determining whether the associated component definition is to be included in a slide presentation; and
      a mapping of each bookmark to an associated opportunity-specific data; and
   a processor, coupled to the computer memories, configured to utilize the presentation definition template to execute a method, the method comprising
      generating a slide presentation for a presentation target by determining whether to include each of the plurality of component definitions in the slide presentation based on its associated query condition, and
      for each of the component definitions determined to be included in the slide presentation, automatically replacing the associated information bookmark with its mapped opportunity-specific data, wherein said determining uses the opportunity-specific data, and said determining and said replacing are performed without human interaction, and
   storing the generated slide presentation.

6. The apparatus of claim 5, wherein the item of data is an opportunity-specific data.

7. A system for generating a slide presentation for a presentation target, comprising:
   a means for creating at least one presentation definition template comprising component definitions, wherein one or more of the component definitions has an associated information bookmark;
   a means for associating a query condition with each component definition, each query condition determining whether the associated component definition is to be included in the slide presentation;
   a means for providing a mapping between each information bookmark and an associated item of data;

a processor comprising:
  means for determining whether to include each of the plurality of component definitions in the slide presentation based on its associated query condition in response to a command to generate a slide presentation for a presentation targets;
  means for, for each of the component definitions determined to be included in the slide presentation, automatically replacing the associated information bookmark with its mapped item of data in response to the command to generate the slide presentation for the presentation target, wherein the processor means for determining uses opportunity-specific data; and
  means for storing the generated slide presentation.

8. The system of claim 7, wherein the presentation target is a potential customer of a sales organization, and wherein the data relates to potential sales opportunities between the sales organization and the potential customer.

9. The system of claim 7 further comprising a means for associating a theme with the template, the theme indicating a primary decision criterion of the presentation target.

10. The system of claim 7, wherein the item of data is an opportunity-specific data.

11. The system of claim 7, wherein the query condition is a predefined threshold.

* * * * *